UNITED STATES PATENT OFFICE.

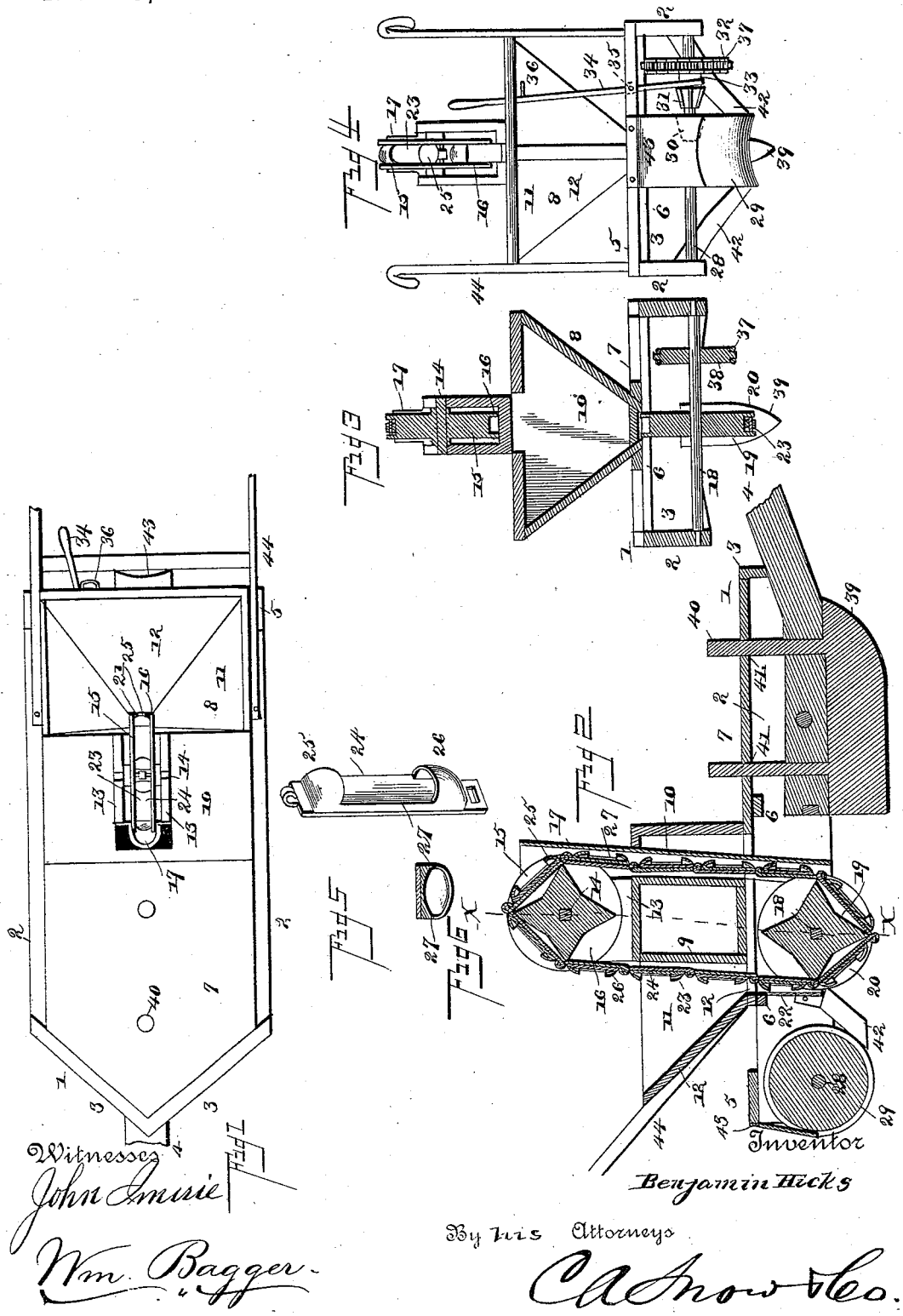

BENJAMIN HICKS, OF VICKSVILLE, VIRGINIA.

PEANUT-PLANTER.

SPECIFICATION forming part of Letters Patent No. 423,686, dated March 18, 1890.

Application filed October 30, 1889. Serial No. 328,703. (No model.)

*To all whom it may concern:*

Be it known that I, BENJAMIN HICKS, a citizen of the United States, residing at Vicksville, in the county of Southampton and State of Virginia, have invented a new and useful Peanut-Planter, of which the following is a specification.

This invention relates to peanut-planters; and it has for its object to provide a machine of this class which shall be exceedingly simple in construction, and by means of which the seed shall be deposited at regular distances apart, and which shall also be provided with mechanism for opening the furrow and for covering the seed.

The invention consists in the improved construction, arrangement, and combination of parts which will be hereinafter fully described, and particularly pointed out in the claims.

In the drawings hereto annexed, Figure 1 is a plan view of my improved peanut-planter. Fig. 2 is a longitudinal sectional view of the same. Fig. 3 is a transverse sectional view taken on the line $x$ $x$ of Fig. 2. Fig. 4 is a rear elevation. Fig. 5 is a perspective detail view of one of the double seed-cups used in connection with my invention. Fig. 6 is a cross-section of the seed-cup.

Like numerals of reference indicate like parts in all the figures of the drawings.

1 designates the frame of the machine, which consists of the side pieces 2 2, the converging front pieces 3 3, at the front ends of which the tongue 4 is attached, and the rear cross-bar 5, which is mounted upon the rear ends of the side pieces 2 2. The side pieces 2 2 of the frame are connected by cross bars or braces 6 6, which serve to support the platform 7, upon which the hopper 8 is mounted. The hopper is divided by a central partition 9 into the front and rear compartments 10 and 11, the latter of which has an inclined rear side 12 for the purpose of guiding the seed to the dropping mechanism, as will be hereinafter more fully described.

13 13 designate a pair of frame-pieces, which are mounted vertically on the front compartment of the hopper, and the upper ends of which are provided with bearings for a transverse shaft 14, carrying a chain-wheel 15, the sides of which are provided with annular flanges 16. A spout 17, which is attached to the front edges of the frame-pieces 13, extends vertically through the bottom of the hopper and terminates a short distance above the ground.

18 designates a shaft, which is mounted in the side pieces 2 of the frame, and which carries a chain-wheel 19, the sides of which, like the chain-wheel 15, are provided with annular flanges 20. The flanges of the chain-wheels 15 and 19 extend between the upper and lower edges, respectively, of the spout 17, so as to form a continuous closed conduit.

The bottom of the rear compartment of the hopper has an opening 21, from which a tube or chute 22 extends downward to within a short distance of the ground. This tube serves as a guide for the chain 23, which passes over the wheels 15 and 19, and each link of which is provided with a double seed-cup, consisting of a body 24, the ends of which are provided with cups 25 and 26, facing each other. The said cups may be of any desired construction and capacity, and they may be formed integrally with or separate from the base 24. The latter should be provided with longitudinal grooves 27, in order to permit the contents of one cup to be readily transferred to the other, as will be presently described.

28 designates the axle, which is mounted in bearings at the rear ends of the side pieces 2 of the frame, and which is provided with a concave-faced wheel 29, which also serves to pack and compress the soil and to leave it in a ridge over the furrow in which the seed has been planted, thus causing water to be shed from the seed. The drive-wheel 29, which is mounted securely upon the shaft or axle, has in one side a polygonal recess 30, adapted to receive a clutch member 31, formed upon one side of a sprocket-wheel 32, which is mounted to slide laterally upon the axle, and which is provided with an annular groove 33, adapted to receive the bifurcated end of a lever 34, which is mounted pivotally in a slot 35 in the rear cross-bar of the frame. It will be seen that by operating the hand-lever 34, which may be retained in position by adjusting it on either side of a stop 36, secured upon the rear side of the hopper, the sprocket-wheel 32 may be moved laterally, so as to throw it into or out of engagement with the drive-wheel. A chain 37 connects the sprocket-wheel 33 with a similar sprocket-wheel 38, mounted upon the shaft 18, which carries the chain-wheel 19, thus communicating motion to the latter and to the chain having the seed-cups.

39 designates a furrow-opener, which is mounted upon the lower ends of a pair of vertical stems 40, which extend upwardly through perforations 41 in the platform 7, and by means of which the said furrow-opener may be adjusted vertically to any desired position. Coverers 42, of any suitable construction, are secured to the inner sides of the side pieces 2 of the frame in rear of the shaft 18, from which they converge in a rearward direction.

A scraper or cleaner 43 is attached to the rear cross-bar 5 of the frame for the purpose of removing any soil which may adhere to the face of the drive-wheel. Handles 44, by means of which the machine may be guided, are to be attached to the frame thereof in any suitable and convenient manner.

The operation of this invention will be readily understood from the foregoing description, taken in connection with the drawings hereto annexed. The machine is adapted to plant not only peanuts, but various other kinds of seed, such as corn, peas, or cotton. The seed is placed in the rear compartment 11 of the hopper, from whence it is taken by the cups 25 of the double seed-cups mounted upon the endless chain. The cups 25 carry the seed up over the chain-wheel 15, the annular flanges of which serve to prevent the seed from dropping out to either side. When the seed-cups pass the upper side of the upper chain-wheel 15, the seed will drop or slide from the cup 25 into the opposite cup 26, the sides or flanges of the tube 17 serving to prevent the seed from being lost. The seed-cups 26 carry the seed to within a short distance of the guard, where it is deposited in the furrow which has been formed by the furrow-opener. The coverers 42 serve to throw the soil back into the furrow, and it is finally packed and compressed by the concave-faced drive-wheel.

By the use of my improved double seed-cups I am enabled to convey the seed more closely to the ground before dropping it, and hence to insure more regularity in the process of planting than has been attainable by devices heretofore employed. The general construction of my improved machine is simple and inexpensive, and it is exceedingly durable and efficient in operation.

Having thus described my invention, I claim—

1. In a peanut-planter, the combination of the frame, the hopper having a transverse partition, a pair of vertical frame-pieces secured in the front compartment of the hopper, and having a chute secured to their front edges and extending within a short distance of the ground, a shaft mounted at the upper ends of said frame-pieces, a transverse shaft mounted between the side pieces of the frame, chain-wheels mounted upon the said shafts and provided with annular flanges at their sides, the endless chain mounted upon the said wheels, and the double seed-cups mounted upon the links of said chain and provided each with two separate cups facing each other, substantially as set forth.

2. In a seed-planter, the combination, with the endless carrying-chain, of the seed-cups mounted upon the links of the same, each comprising a longitudinally-grooved body, and a pair of cups or recesses at the ends of the same facing each other, substantially as set forth.

3. The combination of the frame, the vertically-adjustable furrow-opener, the hopper having the transverse partition, the chutes extending through the bottoms of the front and rear compartments of the hopper, the upper and lower transverse shafts carrying the flanged chain-wheels, the endless chain mounted upon the same and having the double seed-cups, the coverers and the concave-faced drive-wheel, and means for transmitting motion from the latter to the endless chain carrying the seed-cups, substantially as and for the purpose set forth.

In testimony that I claim the foregoing as my own I have hereto affixed my signature in presence of two witnesses.

BENJAMIN HICKS.

Witnesses:
J. D. PRETLOW,
W. H. STEPHENSON.